US005241747A

United States Patent [19]

Harmand

[11] Patent Number: 5,241,747

[45] Date of Patent: Sep. 7, 1993

[54] METHOD OF USING A GRIPPER TOOL FOR ENGINE VALVE DISASSEMBLY/ASSEMBLY

[76] Inventor: Brice Harmand, 1260 Veteran Ave. #223, Los Angeles, Calif. 90024

[21] Appl. No.: 7,160

[22] Filed: Jan. 21, 1993

Related U.S. Application Data

[63] Continuation-in-part of Ser. No. 935,882, Aug. 26, 1992.

[51] Int. Cl.[5] ............ B23P 19/04

[52] U.S. Cl. ............ 29/888.42; 29/402.08; 29/426.5; 29/249

[58] Field of Search ............ 29/888.01, 888.011, 29/888.42, 890.121, 890.124, 404, 426.1, 426.5, 402.03, 402.08, 888.40, 213.1, 214, 221.6, 254, 255, 240, 281.1, 281.4, 281.5, 281.6, 282, 283, 249; 269/8, 287, 45

[56] References Cited

U.S. PATENT DOCUMENTS

| | | | |
|---|---|---|---|
| 1,536,601 | 5/1925 | Anderson | 29/249 |
| 2,091,500 | 8/1937 | Clark | 29/249 |
| 3,315,339 | 4/1967 | Young | 29/249 |
| 3,316,623 | 5/1967 | Clark | 29/249 |
| 3,621,553 | 11/1971 | Lafeber | 269/8 |

*Primary Examiner*—Robert C. Watson
*Attorney, Agent, or Firm*—Martin, Haller & McClain Brown

[57] ABSTRACT

The method of facilitating assembly and disassembly of valves in a cylinder head uses a gripping tool which has a base consisting of a flat ring onto which are mounted three posts extending upwardly therefrom. Rotatable and slidable clips with magnets are mounted on at least two of the posts to capture the loose key bolts. A plate is attached to the top of the posts and a clip may extend upwardly therefrom to permit attachment of an adapter for use with a drill press. The flat ring is centered over the top of the valve stem and key bolt and rests on top of the upper cup which presses against the top of the ring which retains the spring. Force applied to the top of the tool presses down on the upper cup, compressing the spring to release the key bolt. For re-assembly, a centering ring holds the spring centered with the cam bucket bore, providing the contact surface for the flat ring. To facilitate transfer of the cylinder head between work stations, an elastic sheet with an opening for each valve stem locks the valves in place before assembly has been completed.

11 Claims, 2 Drawing Sheets

METHOD OF USING A GRIPPER TOOL FOR ENGINE VALVE DISASSEMBLY/ASSEMBLY

This is a continuation-in-part of co-pending application Ser. No. 07/935/882, filed Aug. 26, 1992.

BACKGROUND OF THE INVENTION

The overhaul of internal combustion engines is an expensive, difficult and time-consuming process. Virtually all internal combustion engines include valves which are operated against spring pressure, and there are at least two valves for each cylinder. Thus, in order to disassemble and reassemble the engine, and specifically the cylinder head, means must be provided to manipulate the valves so that the springs can be removed or attached. These springs are fairly stiff and require a considerable amount of force to be applied to the valve, typically by way of a specialized clamp. This clamp spans a portion of the cylinder head so that it reaches both the valve face and the spring, simultaneously lifting the valve and compressing the spring. Since engines are configured in many different ways, valve locations can vary so that a clamp is required for each type of engine to be serviced, and different valves within a single engine introduce further variables and requirements due to the shape of the engine. This can result in considerable expense to a mechanic to have one or more clamp for each valve arrangement. Further, if the mechanic only has one clamp for a particular valve arrangement, the valves must be disassembled/reassembled serially, making the procedure tedious and time consuming. Thus, duplicate tools may be required. The added tool and labor costs contribute to the time and expense involved in an engine overhaul.

In co-pending applications Ser. Nos. 07/855,098 and 07/915,018, the present inventor disclosed a method and apparatus for facilitating the assembly/disassembly of engine valves. Application Ser. No. 07/855,098 described the procedure for introducing high pressure gas into the combustion chamber of the cylinder head to force the valves outward, compressing the valve springs, to facilitate removal of the key bolt, the small, two-piece ring which wedges into the groove in the valve stem. In the invention of application Ser. No. 07/915,018, the inventor utilized a deformable bladder which expands upon the introduction of a fluid, typically air, to fill the combustion chambers and force the valves outward.

Another step in the disassembly/re-assembly of engine valves is the actual removal/replacement of the key bolts, or locks, which retain the springs on the valve stems. A number of methods are used to accomplish this. In many garages and shops, drill presses are used to supply downward pressure on the upper cup which retains the spring to free the key bolt. The popularity of this practice is primarily due to the fact that many shops have drill presses, and may not have other more appropriate tools. This improvisation, however, puts the valves, and possibly the drill press, at risk, since the work area of the drill press is not intended to handle cylinder heads. Another technique involves striking the end of the valve stem or the upper cup with an inertia hammer. Besides being hazardous to the valves, and somewhat "inexact", there is a risk in these procedures of losing the key bolt after it comes loose.

Further complications are experienced during reassembly of the valves and springs into the cylinder head. First, the tiny key bolt pieces can be dropped while trying to insert them into the retaining ring. The valves can fall out of the valve guides while attempting to reassemble them since there is nothing to hold them in the position to permit access to the valve stem. Also, careful centering of the valve stems within the cam bucket bore is necessary to avoid damage to the bore's inner wall.

SUMMARY OF THE INVENTION

It is an advantage of the present invention to provide a device which facilitates removal of the key bolt during engine valve disassembly.

It is another advantage of the present invention to provide a device which keeps the valve within the valve guide to facilitate transport of a partially assembled cylinder head from one work station to another.

A further advantage of the present invention is to provide a device which presents the key bolt in an easily accessible position for replacement on the valve stem.

Still another advantage of the present invention is to center the spring within the cam bucket bore and to protect the came bucket bore during re-assembly.

In an exemplary embodiment the gripping tool has a base consisting of a flat ring onto which are mounted three posts extending upwardly therefrom. Rotatable and slidable clips with magnets are mounted on at least two of the posts to capture the loosened key bolts. A plate is attached to the top of the posts and a clip may extend upwardly therefrom to permit attachment of an adapter by which the device can be held by the chuck of a drill press. For use, the flat ring is centered over the top of the valve stem and key bolt and rests on top of the upper cup which presses against the top of the ring which retains the spring.

To loosen the key bolt with the gripping tool (the "gripper") in place the magnetic clips are positioned near the key bolt so that the key bolt segments will be magnetically drawn to the magnets after release. The top of the gripper is struck with the inertia hammer, pushing down on the upper cup and spring to release the key bolt segments. The key bolt segments are drawn toward the magnetic clips and the spring and upper cup expand upward to be easily lifted off of the valve stem after the device is removed.

After disassembly, the cylinder head is moved to another work location. For re-assembly following completion of the needed work, the valves are re-inserted into the valve guides before placing the cylinder head on the bench for attachment of the springs and key bolts. In current techniques, the valve stems are held in place only precariously by the oil ring, so that the valves can drop out while the cylinder head is carried. To prevent this, the present invention includes an elastic sheet or strip of rubber or latex in which slits or small holes are formed corresponding to the locations of the valve stems. The elastic sheet is stretched across the top of the cylinder head so that the valve stems stick through the holes in the sheet which resiles to lock to ends of the valve stems in place within their guides. After the cylinder head is on the bench, the elastic sheet is removed to allow access to the valves.

For reassembly, a centering sleeve is inserted to fill the space between the outer diameter of the spring and the inner wall of the cam bucket bore. The gripper is centered over the spring and upper cup which have been placed on the valve stem by inserting the base of the gripper into an annular recess in the centering sleeve. The key bolt segments are held by the magnetic clips of the gripper. By applying downward force onto the top of the gripper, the spring is depressed, allowing access to the top of the valve stem. The magnetic clips are slid downward on the posts so that the key bolt segments are positioned at the proper location of the valve stem. The key bolt segments are then manually released from the magnets, to wedge against the valve stem in the center of the upper cup, and the downward force is released, firmly wedging the key bolt against the valve stem to hold the spring at its desired level of compression. After pressure is released from the top of the gripper, the gripper is lifted away from the spring. The centering sleeve may be removed simultaneously if its annular recess tightly fits the base of the gripper, or separately if the fit is looser.

When a drill press is used to provide the downward force for loosening the key bolt, an arbor at the top of the adapter is inserted into the drill-chuck. The adapter will permit a firm grip by the drill-chuck while applying downward pressure on the upper cup to free the key bolt, with the magnetic clips catching the key bolt segments as they are released.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 6:
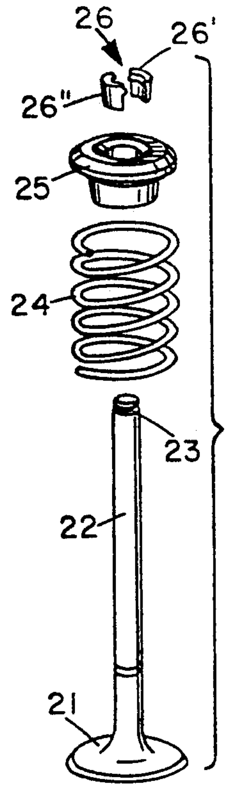
FIG. 6 PRIOR ART
FIG. 6 is an exploded view of a valve assembly (prior art)

FIG. 6 provides a reference to show the relative locations of the components of a valve assembly of the prior art which are of interest in the present invention. Valve 21 has valve stem 22 with notch 23. Spring 24 slides over valve stem 22 and is held in place by upper cup 25 and key bolt 26 made up of segments of 26' and 26".

Figure 1:
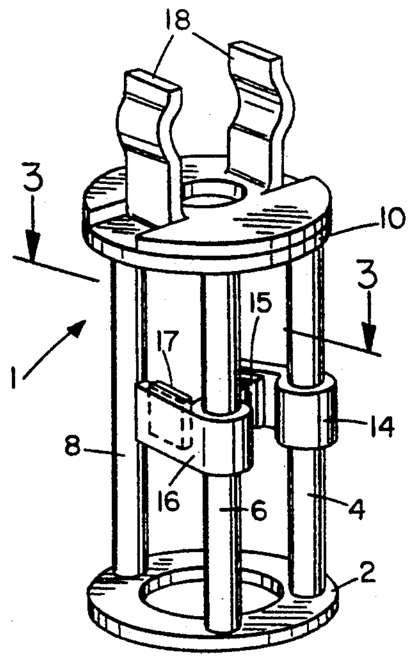
FIG. 1 is a perspective view of the gripping tool.
Figure 9:
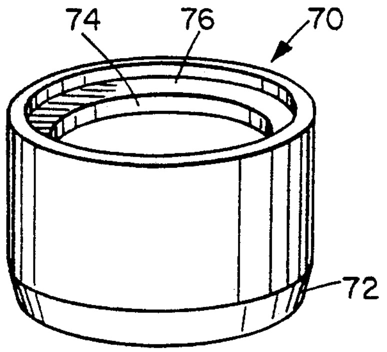
FIG. 9 is a perspective view of the centering sleeve.
Figure 8:
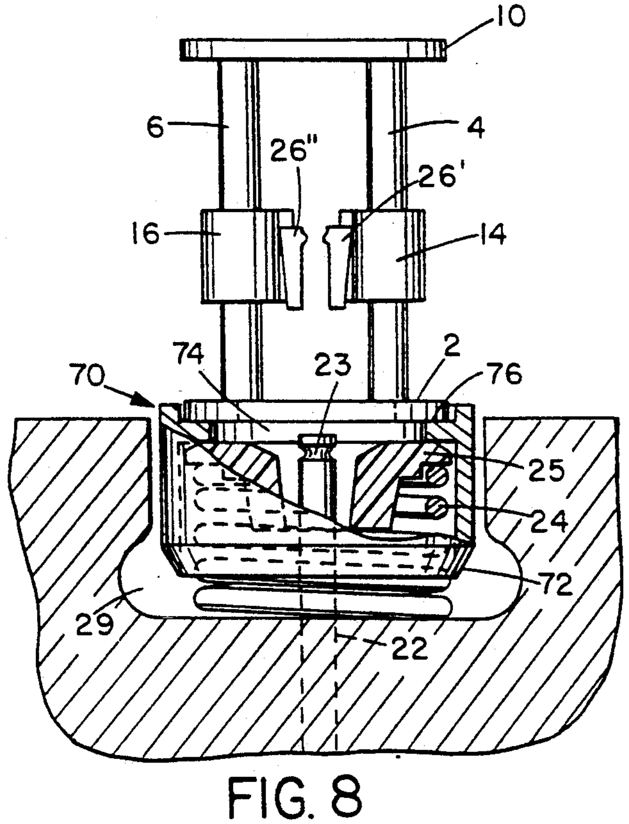
FIG. 8 is a diagrammatic view of the gripping tool and centering sleeve as used in re-assembly of a valve in a cylinder head.

As illustrated in FIG. 1, the gripper tool 1 of the present invention has a base 2 which is a flat ring onto which are mounted three posts 4, 6 and 8. The posts 4, 6 and 8 extend upward to top plate 10. Two magnetic clips 14 and 16 are fitted onto post 4 and 6 so that they will rotate horizontally around the posts and slide vertically on the posts. Magnets 15 and 17 are disposed toward the free ends of magnetic clips 14 and 16, respectively. As illustrated in FIGS. 8 and 9, the centering ring 70 which is used for re-assembly is cylindrical with a beveled lower end 72 and a ring 74 at its top with an inner diameter 74 approximately the same as the inner diameter of base 2 and an annular recess 76 therein with a diameter slightly larger than the outer diameter of base 2. Centering ring 70 is a smooth resilient plastic or polymer, which may include self-lubricating polymers such as Teflon ®.

Figure 3:
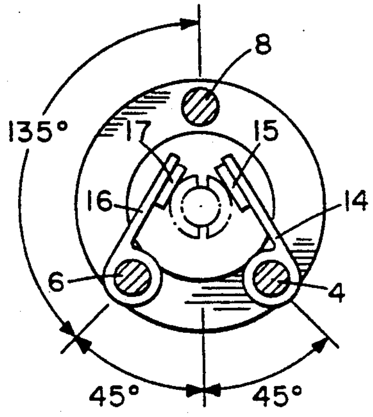
FIG. 3 is a cross-sectional view taken along line 3—3 of FIG. 1.

As can be seen in FIG. 3, posts 4, 6 and 8 need not be spaced evenly around base 2. While it is possible to provide a functional tool with even spacing, the larger spacing between post 8 and posts 4 and 6 provides better visibility and accessibility as compared to an evenly-spaced arrangement. A suggested spacing is 135° each from post 8 to post 4 and from post 8 to post 6. Also, as few as two, or more than three, posts can be used as long as they have sufficient strength and adequate working room is provided.

The posts 4, 6 and 8 are preferably cylindrical, but may be any generally-rounded shape which permits free rotation of the magnetic clips 14 and 16 around their corresponding posts. The length of the posts should be sufficient to accommodate the protruding length of the valve stem 22 when the spring 24 is fully compressed, as in FIG. 4. The material of which the posts are made must provide high compression resistance and be able to withstand the impact of an inertia hammer used to loosen the key bolts.

Figure 2:
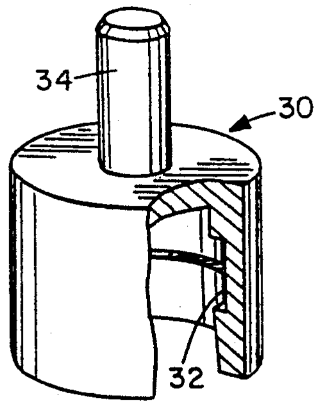
FIG. 2 is a perspective view, partially cut-away, of an adapter for use with the gripping tool.

Clips 18 may be attached or formed on top of top plate 10 to permit attachment of adapter 30 for use with a drill press. As illustrated in FIG. 2, clips 18 are spring metal or other similarly resilient durable material which will snap into groove 32 of adapter 30 when adapter 30 is pressed down over the top of the clips 18. Groove 32 is circular, running around the entire inner wall of adapter 30, so that the device 1 can be rotated a full 360° while using the adapter. Adapter 30, illustrated in FIG. 2, is held by a sliding clamp 62 which can be attached to an inertia hammer 40 to loosen the key bolts 26 from the valve stem 22 as in FIGS. 4 and 5. The arbor 34 which extends upward from adapter 30 is inserted into the chuck of a drill-press. Even though the arbor 34 is firmly locked in the drill-chuck, the configuration of the clips 18 and groove 32 permit the device 1 to be rotated to obtain the best possible access to the key bolt through the posts. By lowering the chuck of the drill-press the device 1 is forced downward to transfer the force to upper cup 25, thus loosening the key bolt.

Figure 4:
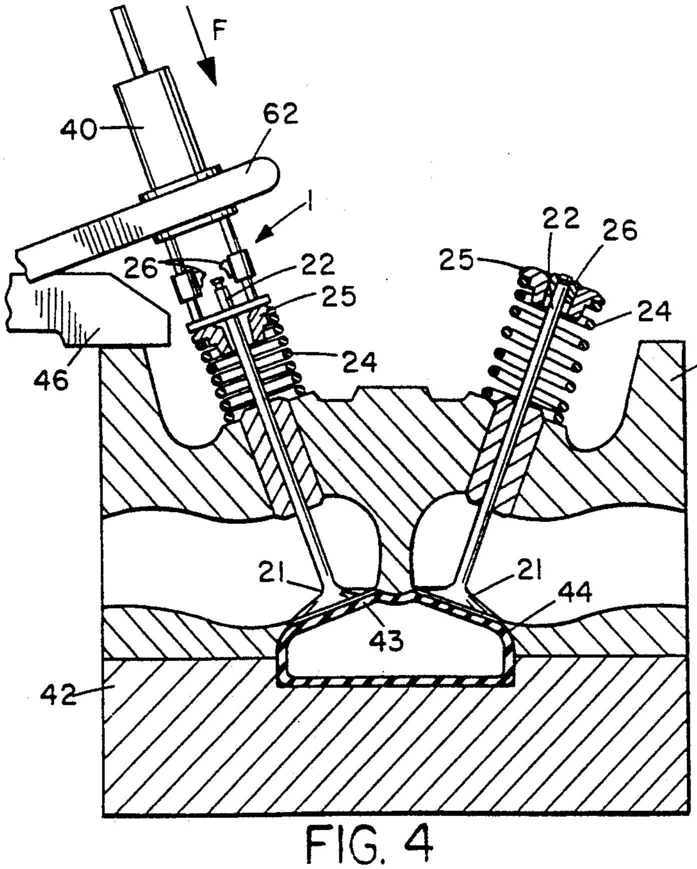
FIG. 4 is a diagrammatic view of the gripping tool as used in disassembly of a valve in a cylinder head.

FIG. 4 illustrates the use of the gripper tool 1 for removal of the key bolt 26 from valve stem 22 as assembled into cylinder head 19. The following description describes the device's use in conjunction with the invention disclosed in co-pending application Ser. No. 07/915,018, however, the device herein described is also applicable to conventional techniques which use clamps or other hardware to lift the valves 21 to permit removal of the key bolts.

The cylinder head 19 is placed on table 42 into which is built a deformable bladder or membrane 43. With the chambers 44 centered over the bladder 43, the cylinder head 19 is firmly held onto table 42 by clamps 46. Sliding panels within the table 42 expose only as much of membrane 43 as is needed for the particular cylinder head. The membrane 43 is inflated by a hand pump to fill chambers 44 and lift valves 21. The membrane 43 is sealed by closing a valve to the hand pump so that the air is retained therein.

The gripper tool 1 is placed on top of upper cup 25 so that it is centered over the valve stem 22. Gripper tool 1 is connected to the inertia hammer 40 by a sliding clamp 60 which allows positioning of the gripper tool 1 along the cylinder head as necessary. The magnetic clips 14 and 16 are moved to a position near the key bolt 26.

The inertia hammer 40 is activated so that force F is applied to the top of gripper tool 1. Base 2 pushes down on upper cup 25 with an impact that breaks the compressive force of the inner diameter of upper cup 25 on the key bolt 26 and the valve stem 22. The key bolt segments 26' and 26" are loosened such that when the spring 24 resiles after the impact they are loosely carried upward on top of the upper cup 25. The loose key bolt segments are attracted to magnetic clips 14 and 16 and retained there until removed by the user, usually with tweezers or needle-nose pliers. If the attraction of magnets 15 and 17 is not sufficient to pick up the key bolt segments, because the distance between them is excessive, the magnetic clips 14 and 16 can be moved vertically and/or rotated horizontally to a position which permits the attraction of the key bolt segments 26' and 26".

Figure 5:
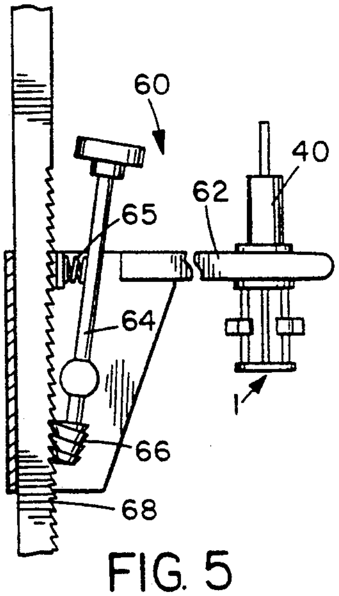
FIG. 5 is a diagrammatic view of a support/placement mechanism for the device of the present invention.

The support/placement mechanism 60 illustrated in FIG. 5 permits rapid movement from one valve to another across the cylinder head. Sliding clamp 62 extends from mechanism 60 to hold the gripper tool 1 and inertia hammer 40. For rapid movement of the gripper tool 1, handle 64 is depressed so that it pivots on spring 65 to release screw 66 from toothed rack 68. For more precise positioning, and to provide a constant compressive force on the upper cup 25 for reassembly of the valve, handle 64 is turned so that the screw 66 guides the mechanism 60 up or down along toothed rack 68. Movement of the mechanism 60 downward applies gradual pressure to the gripper tool which transfers the force to upper cup 25 and spring 24 to compress spring 24 to allow key bolt segments 26' and 26" to be removed from or inserted at the notch 23 of valve stem 22. The pressure is then gradually released by moving mechanism 60 upward by turning handle 64.

Figure 7:
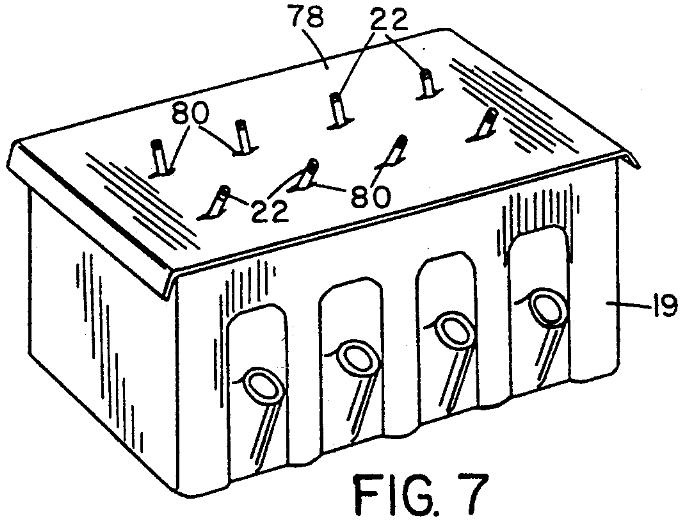
FIG. 7 is a perspective view of the elastic sheet in place on a cylinder head ready for re-assembly.

After completing the work that is to be done to the cylinder head, e.g., machining, cleaning, etc., the valve stems 22 are re-inserted into the valve guides 23. The elastic sheet 78 is cut to have openings 80 which correspond to the locations of the valve stems 22 protruding through the upper end of the cylinder head. Elastic sheet 78 is stretched and pushed over the valve stems 22 as they poke through their corresponding openings 80, as shown in FIG. 7. When elastic sheet 78 resiles, it locks the valve stems 22 to be locked in place so that the cylinder head 19 can be safely carried to the bench that is used to re-attach the springs 24 and key bolts 26.

After the cylinder head 19 is in place on work table 42, elastic sheet 78 is removed and spring 24 and retaining ring 25 are put in place over the valve stem 22. Centering ring 70 is pushed over spring 24 into the cam bucket bore 29. Gripper tool 2 is centered within annular recess 76 of centering ring 70 for re-assembly. It may also be desirable to utilize the centering ring 70 for the initial disassembly procedure to assure that the flat plate 2 does not slip off center, causing it to strike the inner wall of the cam bucket bore.

During reassembly of the valves, the key bolt segments 26' and 26" can be retained by magnets 15 and 17 so that they are readily available and accessible for installation.

Downward force is applied to the gripper tool 2 as previously described for disassembly. With the spring 24 depressed, key bolt segments 26' and 26" are dropped into place between retaining ring 25 and valve stem 25. The downward force is gradually released, trapping the key bolt 26 within notch 23.

The gripper tool of the present invention provides means for disassembly valves from cylinder heads easily and efficiency when used in combination with the device disclosed in co-pending application Ser. No. 07/915,018, and can even improve currently-practiced methods of valve disassembly. Key bolts are very small, difficult to handle and easily lost. The gripper tool can virtually eliminate loss of key bolts during disassembly. The gripper tool also provides an efficient means for applying force to the upper cup to release the key bolt, and to provide compression of the valve spring to permit reassembly. Finally, the gripper tool presents the key bolts in the proper position for reassembly, and, in combination with elastic sheet 78 and centering ring, greatly facilitate trouble-free re-assembly.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. In a cylinder head assembly having at least one valve with a valve stem, a spring disposed around said valve stem, a retaining ring on top of said spring, and a key bolt for locking said retaining ring at a fixed location of said valve stem so that said valve spring is at least partially compressed, a method for facilitating removal of said key bolt which comprises:

centering a flat ring over said valve stem adjacent said retaining ring;

disposing a plurality of magnetic clips on a plurality of posts connected to said flat ring so that said plurality of magnetic clips is sufficiently close to said key bolt to magnetically attract said key bolt;

applying a force to a top plate connected to said plurality of posts, said top plate being parallel to and at a fixed distance from said flat ring;

compressing said valve spring with said force;

releasing said key bolt; and attracting and retaining said key bolt with said plurality of magnetic clips.

2. A method as in claim 1 wherein the step of applying a force comprises striking said top plate with an inertia hammer.

3. A method as in claim 1 wherein the step of disposing a plurality of magnetic clips includes sliding said magnetic clips vertically along said posts and rotating said magnetic clips horizontally around said posts to adjust a distance between said magnetic clips and said key bolt.

4. A method as in claim 1 wherein the step of applying a force comprises connecting said top plate to a drill-press.

5. In a cylinder head assembly having at least one valve with a valve stem, a spring disposed around said stem, a retaining ring on top of said spring, and a key bolt for locking said retaining ring at a fixed location of said valve stem so that said valve spring is at least partially compressed, a method for facilitating assembly of said key bolt with said valve stem which comprises:

inserting centering ring over said spring within a bore in said cylinder head, said centering ring having a flattened upper end;

centering a flat ring over said valve stem on top of said flattened upper end and adjacent said retaining ring;

disposing a plurality of magnetic clips on a plurality of posts connected to said flat ring;

releaseably retaining said key bolt on said plurality of magnetic clips;

applying a force to a top plate connected to said plurality of posts, said top plate being parallel to and at a fixed distance from said flat ring;

compressing said valve spring with said force;

releasing and placing said key bolt on said retaining ring at its center adjacent said valve stem; and releasing said force so that said key bolt is wedged between said retaining ring and said valve stem.

6. A method as in claim 5 wherein the step of disposing a plurality of magnetic clips includes sliding said magnetic clips vertically along said posts and rotating said magnetic clips horizontally around said posts to adjust a distance between said key bolt and said predetermined location on said valve stem.

7. A method as in claim 5 wherein the step of centering a flat ring includes inserting said flat ring into an annular recess in said flattened upper end of said centering ring.

8. A method of assembling a plurality of valve and spring combinations in a cylinder head which comprises: corresponding valve guide in said cylinder head;

providing an elastic sheet having a plurality of openings therein, each opening corresponding to the location of each said valve stem;

stretching said elastic sheet and inserting an end of each valve stem through its corresponding opening in said elastic sheet;

releasing said elastic sheet so that its resiles to lock each said valve stem in place;

transporting said cylinder head to a work table where said valve and spring combinations are to be assembled;

clamping said cylinder head to said work table;

removing said elastic sheet;

sliding a spring over each said valve stem;

sliding a retaining ring on top of said spring;

centering a flat ring over said valve stem on top of said retaining ring;

disposing a plurality of magnetic clips on a plurality of posts connected to said flat ring;

applying a force to a top plate connected to said plurality of posts, said top plate being parallel to and at a fixed distance from said flat ring;

compressing said valve spring with said force;

placing a key bolt on said plurality of magnetic clips;

sliding said magnetic clips to be magnetically close to said retaining ring;

releasing and placing said key bolt on said retaining ring at its center adjacent said valve stem; and releasing said force so that said key bolt is wedged between said retaining ring and said valve stem.

9. A method as in claim 8 wherein the step of providing an elastic sheet including selecting a rubber or rubber-like material.

10. A method as in claim 8, wherein the step of transporting said cylinder head to a work table includes placing said cylinder head on a table having an inflatable bladder for lifting said valve to facilitate access to said valve stem.

11. A method as in claim 8 wherein the step of centering a flat ring comprises:

inserting a centering ring over said spring within a bore in said cylinder head, said centering ring having a flattened upper end; and inserting said flat ring into an annular recess in said flattened upper end of said centering ring.

* * * * *

UNITED STATES PATENT AND TRADEMARK OFFICE

CERTIFICATE OF CORRECTION

PATENT NO. : 5,241,747

DATED : 9/7/93

INVENTOR(S) : HARMAND, Brice

It is certified that error appears in the above-indentified patent and that said Letters Patent is hereby corrected as shown below:

Column 7, claim 8, line 30, after ":" insert -- inserting a valve stem of each valve into a --.

Signed and Sealed this

Twenty-sixth Day of April, 1994

Attest:

Bruce Lehman

BRUCE LEHMAN

*Attesting Officer* *Commissioner of Patents and Trademarks*